Sept. 10, 1929.　　　C. W. FREDERICK　　　1,727,341
ILLUMINATING REFLECTOR
Filed Jan. 27, 1928　　　3 Sheets-Sheet 1
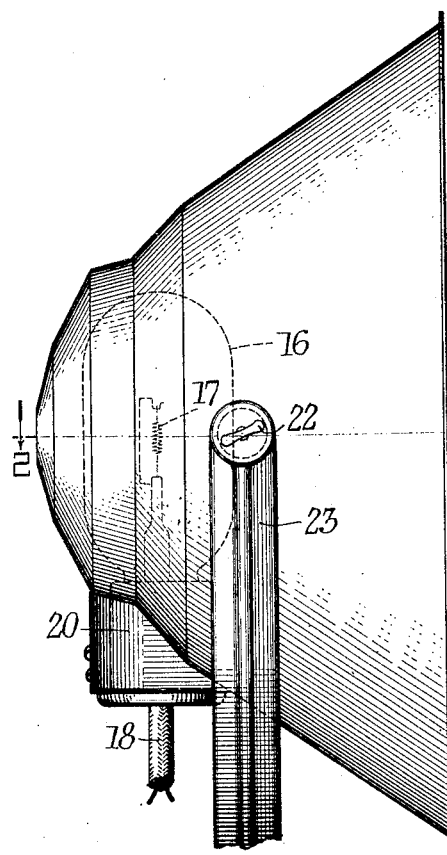
FIG_1_
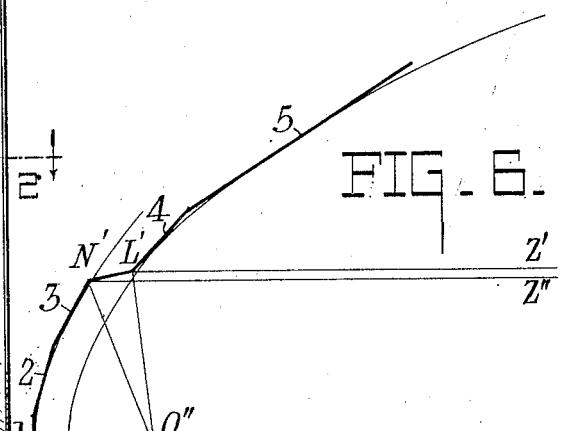
FIG_6_
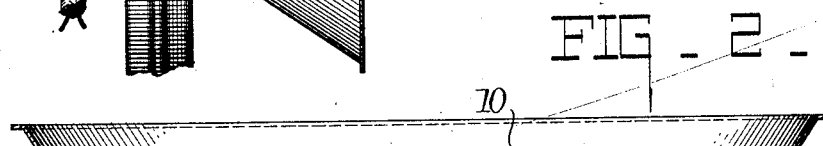
FIG_2_
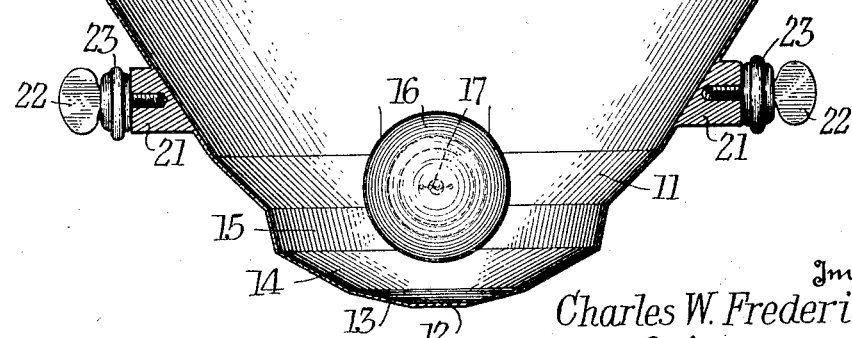
Inventor,
Charles W. Frederick,
By R. L. Stuichfield
N. M. Perrws
Attorneys

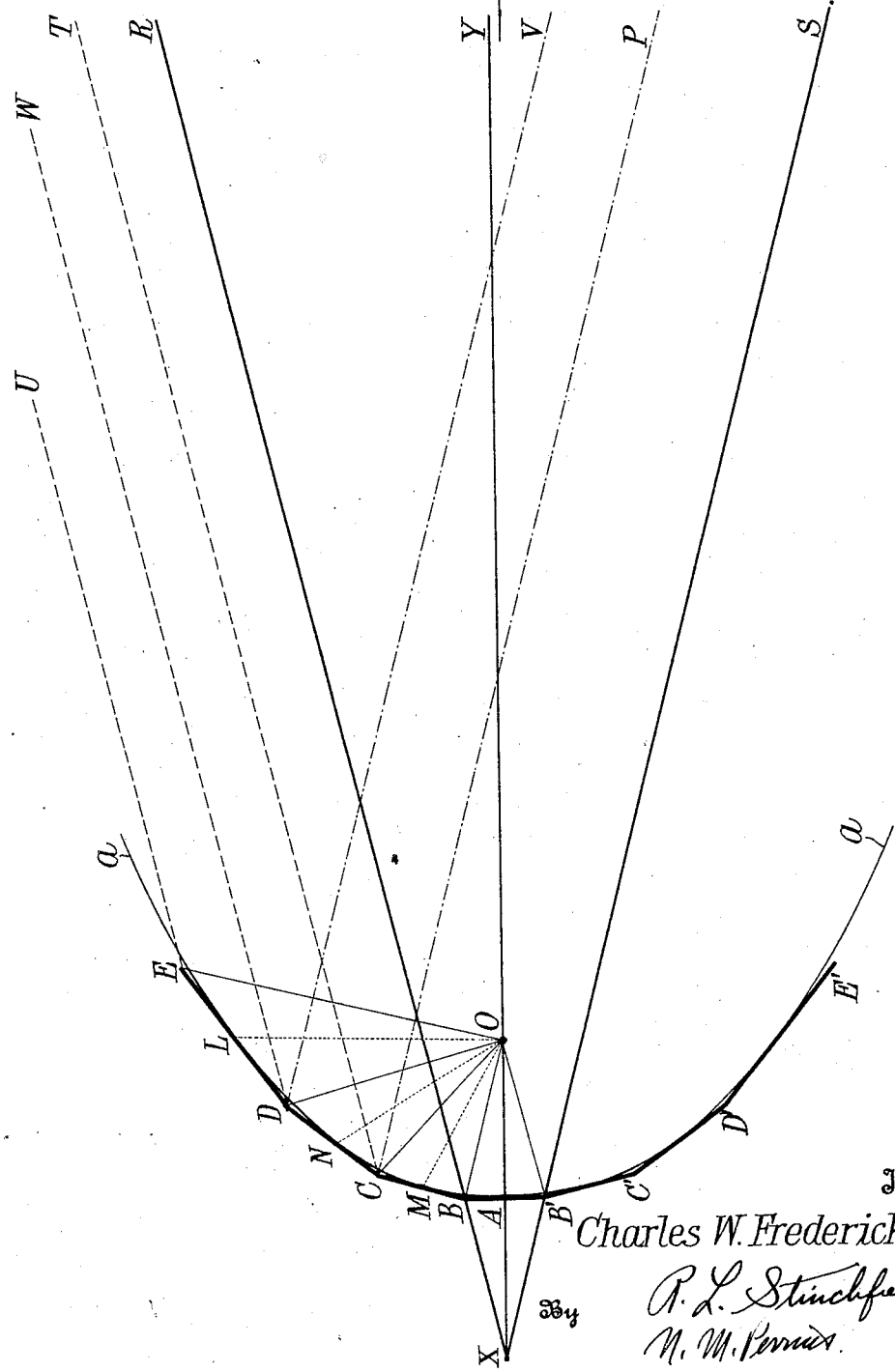

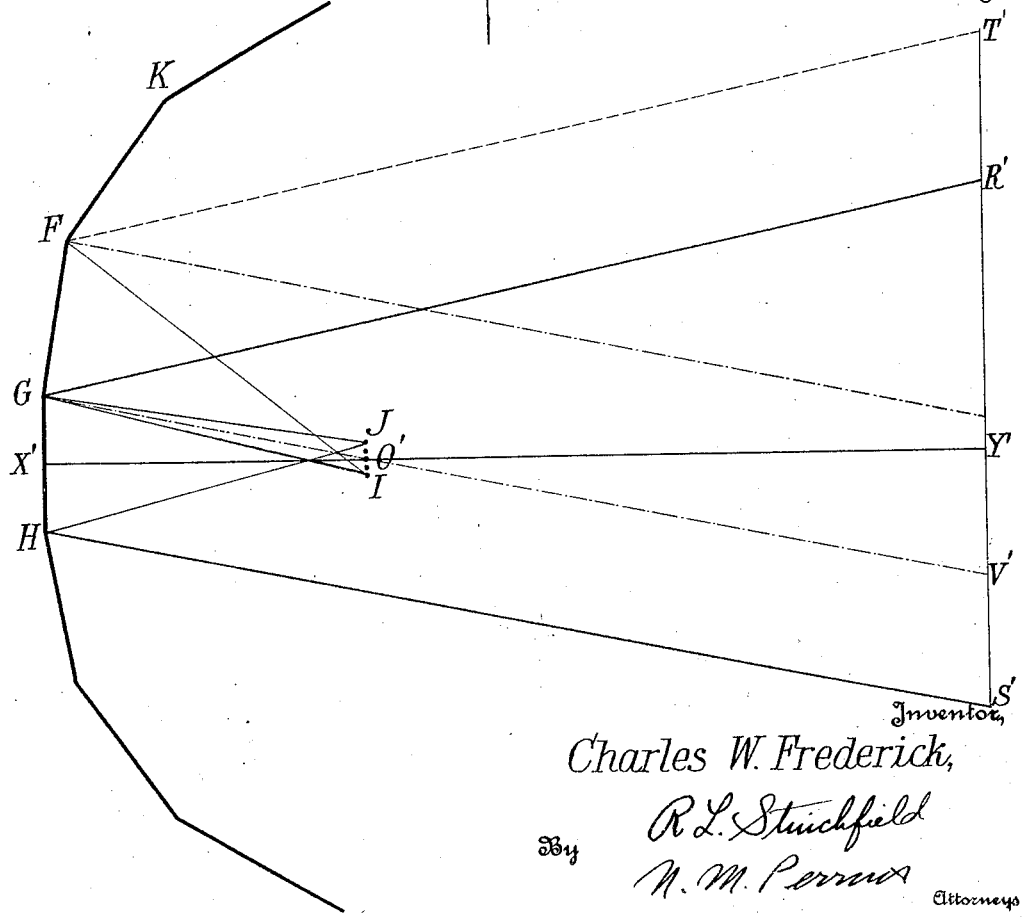

Patented Sept. 10, 1929.

1,727,341

UNITED STATES PATENT OFFICE.

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK.

ILLUMINATING REFLECTOR.

Application filed January 27, 1928. Serial No. 249,837.

This invention relates to reflectors and more specifically to reflectors particularly intended for use in flood lighting where an even illumination is desirable over a defined area, as in studio photography and cinematography. By its unique structure, which will be understood from the following extended disclosure, particularly high efficiency and substantially uniform illumination are obtained over the useful range of the beam from the reflector and there is a comparatively narrow border where the illumination falls away rapidly, so that little light is wasted over areas that are only partially illuminated.

Reference will now be made to the accompanying drawings wherein

Fig. 1 is a side elevation of a preferred practical embodiment of my invention;

Fig. 2 is a sectional view of the same embodiment along line 2—2 of Fig. 1;

Figs. 3 and 4 are diagrams used to explain the theory underlying my invention, particularly with a point source of light.

Fig. 5 is a diagram used to explain my invention as applied to a reflector designed for use with an extended light source.

Fig. 6 is a diagram showing a more complex structure such as is used in my preferred form.

A section of a reflector embodying my invention for use with a point source of light may be laid out as in the following manner, reference being made to Fig. 3. The light source is located at O, and at a distance behind it dependent on the size of the lamp bulb and the final desired dimensions of the reflector a line B'AB is laid off perpendicularly to the axis XOY at A; its length being such that light from O reflected from the end points B' and B will subtend the desired angle RXS. The line BC is then laid off at such an angle that light from O to the point B, considered as a portion of the line BC, will be reflected approximately parallel to B'S, that is back through O. The line BC is of such length that light from its terminal point C is reflected along a line CT, approximately parallel to BR; similarly succeeding lines CD and DE are laid off such that the limiting rays of the beam from O are reflected along lines CP and DV, parallel to B'S, and lines DW and EU, parallel to BR. These lines with the symmetrical ones B'C', C'D', and D'E' constitute a section of a reflector embodying my invention. In the lines there are points A, M, N and L from which rays from O are reflected coincident with or parallel to the axis. These points are points on a parabola $a$ having its focus at O, and to which the several lines are tangent at these points. The reflector, which is a surface of revolution about the axis, therefore comprises frustro-conical surfaces tangent to a parabola.

Considering now an illuminated distant plane, through Z, Fig. 4, which shows the same reflector on a smaller scale, a portion of this will be illuminated by rays reflected from DE, the limiting rays being EU and DV. A portion will be illuminated by rays from D'E', the limiting rays being D'W' and E'U' parallel to EU and DV respectively. Every point in that portion of the plane between W' and V will be illuminated by rays from each of the sections of the reflector. Any point between U and W' or between V and U' will receive light from a portion only of the sections. The plane will therefore be illuminated with substantial uniformity over a large, useful circular area, around which is a comparatively narrow band the illumination in which rapidly decreases outwardly.

If the source of light has an appreciably extended area, such as a series of parallel filaments, the design can be modified to meet the requirements. The light source is then an extended area, O', Fig. 5. The boundary rays from the upper edge G of a plane surface GH perpendicular to the axis X'Y' would be a ray emanating from the lowest point I of the light source and reflected along the path GR' and a ray emanating from the highest point J of the light source and reflected from the lower edge H of the plane along the path HS'. The lines GR' and HS' would then determine the useful angle of illumination. The next plane would then be so laid off that the limiting reflected rays JGV' and IFT' will be parallel to HS' and GR' respectively. The next plane FK is laid off on the same principle. It is to be noted that the rays from I and J are close together for the outer zones of the reflector, and these zones are substantially the same as if laid out for a point source. Since these are the zones of greatest area, I find that a reflector, laid out as in Fig. 3 is sufficiently efficient for use with a concentrated filament type of light source such as is found in commercial lamps having a series of parallel coiled filaments close together.

In practice I find it advantageous, on account of the size of the lamp, to make the zones near the axis in a separate series from the outer zones. Such a form is shown diagrammatically in Fig. 6 where O'' is the common focus of two parabolas, $b$ and $c$, to one of which the zones 1, 2, and 3, are tangent and to the other of which the zones 4 and 5 are tangent. These zones are laid out in the manner already described, the zone 3, however extends only to the point at which rays from the source O'' are reflected along a line N'Z'' parallel to the axis, and the zone 4 begins at a point at which rays from the source O'' are reflected along a line L'Z' parallel to the axis. Zones 3 and 4 are therefore effective as a single zone. By this double construction, I am able to make a more compact reflector, since zones 1, 2 and 3 are sufficiently removed from the focus to permit a light bulb to be easily positioned, while the zones 4 and 5 embrace the bulb more closely and are as efficient as larger zones of the first series would be. The zone N'L' reflects rays back through the focus to the outer zones on the other side and thence along the illuminating beam.

In Figs. 1 and 2 is shown a reflector embodying my invention as outlined in Figure 6. The reflector has an outer zone 10, and a second zone 11, corresponding to zones 5 and 4 of Fig. 6; and inner zones 12, 13 and 14 corresponding to 1, 2 and 3, respectively, and a connecting zone 15 corresponding to zone N'L'. It is understood that the reflector is circular, as viewed axially, except as modified at 20 to form a support for the lamp 16, having filaments 17. An electric cord 18 extends to the lamp support. The reflector has outwardly directed lugs 21 by which it is adjustably carried, through thumb screws 22, by the standard 23. The filament and lamp are carefully positioned with respect to the support so that the filament is centered substantially at the common focus of the two parabolas determining the position of the zones of the two series.

I contemplate as included in my invention all such modifications and equivalents as fall within the scope of the appended claims.

Having thus described my invention, what I claim as new and desire to secure by Letters Patent is,—

1. A concave illuminating reflector in the form of a surface of revolution about an axis, a section of said surface along a plane including the axis comprising tangents to a parabola, and means for supporting a lamp with a concentrated filament with the filament at the focus of such parabola.

2. A concave illuminating reflector in the form of a surface of revolution about an axis, and comprising zones each of which is a frustro conical surface tangent to a parabola, and means for supporting a lamp with a concentrated filament at the focus of such parabola.

3. A concave floodlight reflector in the form of a surface of revolution about an axis, and comprising two series of zones, the zones of each series being frustro conical surfaces tangent to a parabola, the two parabolas having a common focus, one of the series of zones being near the axis and the other being further from the axis.

4. A concave floodlight reflector in the form of a surface of revolution about an axis, and comprising two series of zones, the zones of each series being frustro conical surfaces tangent to a parabola, the two parabolas having a common focus, one of the series of zones being near the axis and the other being further from the axis, the parabola to which the zones of the first series are tangent intersecting the axis farther from the focus than the other parabola.

5. A concave floodlight reflector in the form of a surface of revolution about an axis, and comprising two series of zones, the zones of each series being frustro conical surfaces tangent to a parabola, the two parabolas having a common focus, one of the series of zones being near the axis and the other being further from the axis, and means for supporting a lamp with a concentrated filament with the filament at such focus.

6. An illuminating unit comprising a reflector, a lamp support and a lamp with a concentrated filament carried thereby, the filament having a defined position, the reflector having a concave, specularly reflecting surface in the form of a surface of revolution about an axis through the filament and comprising two series of contiguous zones, one series being further removed from the axis than the other, the zones of each series being frustro conical surfaces tangent to a parabola, the two parabolas having a comomn focus, the parabola to which the zones of the series nearer the axis are tangent intersecting the axis further from the focus than the other parabola, the focus being a point in the concentrated filament.

7. An illuminating reflector comprising a shell having a concave reflecting surface in the form of a surface of revolution about an axis through a focus and designed to project rays from such a focus in a beam subtending a definite predetermined angle, said surface comprising a series of zones, the axial sections of which are straight lines, the position of the edges of each zone being determined by the fact that rays of light from the focus to such edges are reflected therefrom at an angle to one another equal to the definite, predetermined angle.

8. An illuminating unit comprising a source of light and a specular reflector having a surface concave to the source and in the form of a surface of revolution about an axis through said source and designed to project light from said source in a beam subtending a predetermined, definite angle about such axis, the surface comprising a series of zones, the sections of which are straight lines, the positions of the edges of each zone being determined by the definite relation between the zone and the light source such that the limiting rays from the source to the edges of the zone subtend, after reflection, an angle equal to said predetermined definite angle.

9. An illuminating unit comprising a reflector, a lamp support and a lamp with a concentrated filament carried thereby, the filament having a defined position, the reflector having a specularly reflecting surface concave to said filament and in the form of a surface of revolution about an axis through said filament and designed to project light from said source in a beam subtending a predetermined definite angle about such axis, the surface comprising a series of zones, the sections of which are straight lines, the positions of the edges of each zone being determined by the definite relation between the zone and the filament such that the limiting rays from the filament to the edges of the zone subtend, after reflection, an angle equal to said predetermined, definite angle.

Signed at Rochester, New York this 24 day of January, 1928.

CHARLES W. FREDERICK.